Patented Feb. 26, 1929.

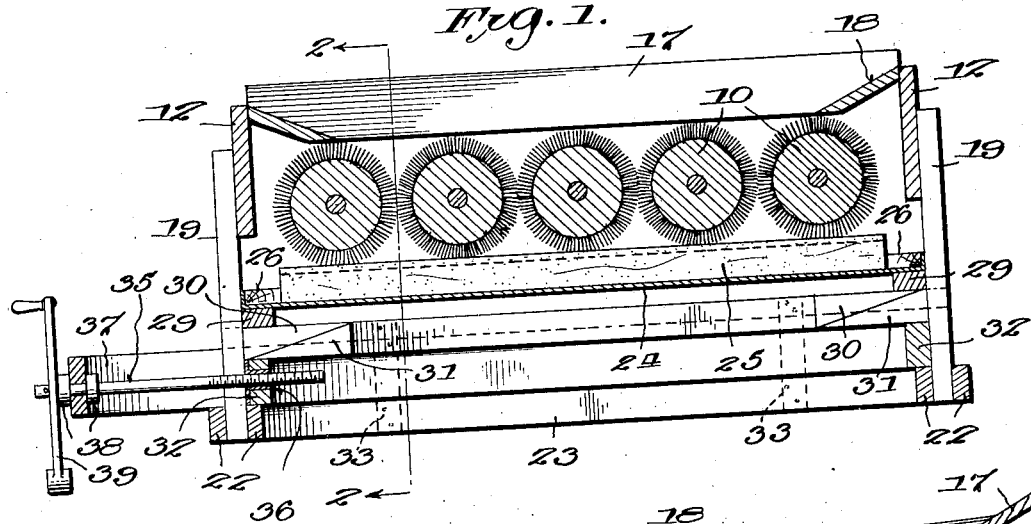
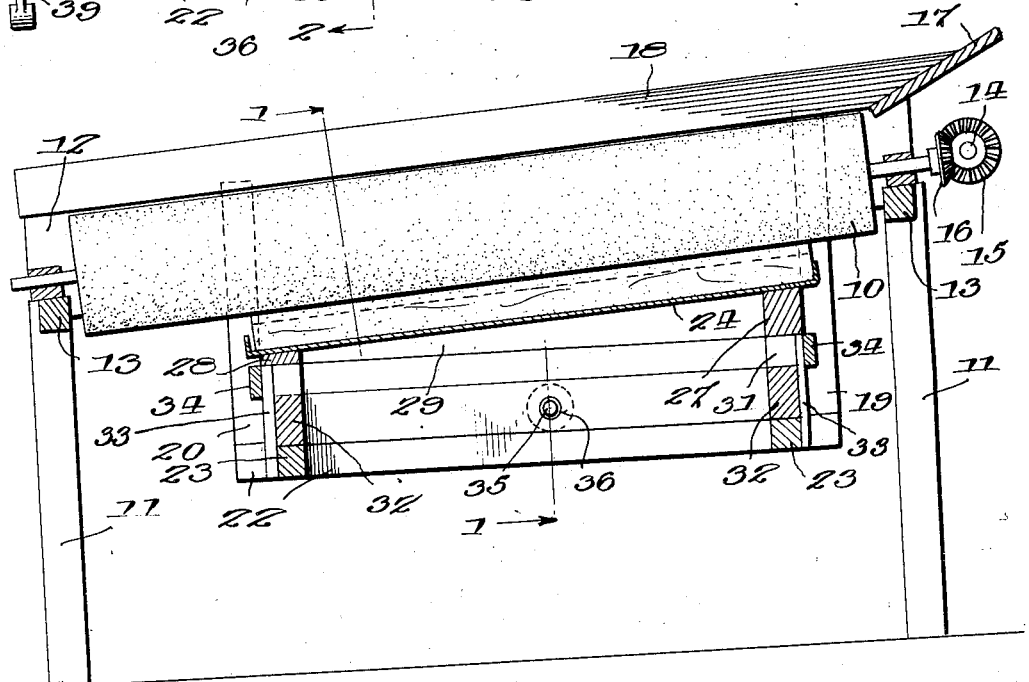

1,703,144

UNITED STATES PATENT OFFICE.

ALBERT HAWORTH, OF WINTER HAVEN, FLORIDA, ASSIGNOR TO BROGDEX COMPANY, OF WINTER HAVEN, FLORIDA, A CORPORATION OF FLORIDA.

APPARATUS FOR TREATING FRUIT AND THE LIKE.

Application filed August 30, 1923, Serial No. 660,213. Renewed June 28, 1927.

This invention relates to apparatus for treating fruit and the like; and it relates more particularly to apparatus for treating fruit and the like with a coating and polishing material.

The invention is concerned more particularly with the treatment of fruit, especially citrus fruit such as oranges, tangerines, grapefruit and lemons, with a coating and polishing material. Paraffin wax, either with or without an admixed softening agent, is typical of the material used and is applied in the fruit-treatment referred to in manner and quantity to provide the fruit with the desired polish and also to form a protective coating over the surface of the fruit.

Apparatus of the type adapted for the particular treatment of fruit here referred to embodies means for applying the protective material to the fruit and for brushing or rubbing the surface of the fruit to provide the desired coating and polish. One suitable form of fruit-brushing or rubbing means, comprises parallel revoluble brush-rolls having their brushing surfaces constituted of horse-hair bristles or the like, the brush-rolls cooperating in pairs to form runways along which the fruit progresses. The rolls all rotate in the same direction and at a speed sufficient to perform the required brushing or rubbing action on the fruit. Although that precise form of fruit-brushing means is not essential, it is particularly effective in an apparatus of the type to which my invention relates. When paraffin wax is the particular polishing and coating material employed in apparatus of the type here referred to, it is generally used in slab-like form. A single large slab of the wax, or a plurality of slabs, may be mounted below the brush-rolls for adjustably variable frictional engagement along a substantial portion of the length of one or more of the brush-rolls. By this arrangement, the brush-rolls take up from the slab or slabs an adjustable quantity of the wax, depending on the degree of solidity of the wax and the engaging pressure of the slab or slabs against the rolls, the continued rotation of the rolls then effecting a transfer of the material to the fruit traversing the runways formed by the rolls; and, as the fruit traverses the entire length of the runways, the brush surfaces of the rolls also function to thoroughly rub the fruit after application of the waxy material thereto and thus to produce the desired polish and extremely thin protective coating. From time to time adjustments of the slab or slabs of wax toward the brush-rolls must be made to compensate for the material taken therefrom, and to provide for that precise degree of engaging pressure of the slabs against the brush rolls which determines the quantity of material to be transferred to the fruit and which corresponds to the thickness of the coating desired thereon. For attainment of most effective results in the formation of the coating and polish, it is advisable either to use a low-melting paraffin wax or wax composition, or else to conduct the operation in a heated environment, in order that the protective material may be spread upon the fruit to the best advantage.

One important feature of this invention is the provision, in an apparatus of the general character thus outlined, of an adjustable mounting or holder for presenting the paraffin wax or other solid or semi-solid coating and polishing material, used in slab-like or any other convenient form, to the brush-rolls, together with adjusting means associated with such mounting or holder, and operable by one adjusting movement to simultaneously adjust the engaging pressure of the body or bodies of the material against the brush-rolls over all points of contact of the material with the brush rolls.

The foregoing and further objects and the novel features of the invention will more fully appear from the description hereinafter given of a typical concrete embodiment thereof exemplified in the apparatus shown in the accompanying drawings forming a part of this specification, and will then be more particularly pointed out in the appended claims. It is to be understood, however, that the typical embodiment hereinafter described is merely illustrative and that various changes and modifications may be made within the broad scope of the invention as defined in said claims.

Referring to the drawings:

Fig. 1 is a transverse section of apparatus constructed in accordance with my invention, the section being taken on the broken line 1—1 of Fig. 2, looking in the direction of the arrows;

Fig. 2 is a longitudinal section of the apparatus taken on the line 2—2 of Fig. 1.

In the particular construction here chosen to illustrate the principles of the invention, the fruit brushing means is of the brush-roll fruit polisher type. In the present instance, the inclined rotary brush-rolls of this type of polisher are indicated generally at 10. A plurality of such rolls may be provided, five being shown by way of example in the present apparatus, mounted in the main framework of the machine. This framework comprises the uprights 11, the side-members 12, and the end-members 13 upon which the brush rolls are rotatably mounted as shown. The brush rolls are driven in the same direction of rotation from the driving shaft 14 through the cooperating bevel gears 15 and 16. The rotary brush rolls 10 may be provided with brush-surfaces of any character adapted to perform the rubbing or brushing action here required to distribute the paraffin wax or the like over the surface of the fruit and to produce the polish. Brush rolls having soft brushing surfaces of horse-hair bristles are suitable for the purposes of the invention and are desirable to employ. In the present instance, the brush rolls are arranged with the rolls inclined and parallel and cooperating in pairs to provide between the rolls of each pair a trough-like runway for fruit, said runway gently sloping from the upper or receiving end of the polisher to the lower or discharge end. An inclined feeding chute or board for directing fruit to the upper end of the brush rolls, is indicated at 17. Side boards 18, are provided extending from the feed chute and inwardly inclined to the crowns of the two outer brush rolls of the group along their entire length.

For mounting the movable holder for the block or slab of paraffin wax or like coating and polishing material employed, together with the adjusting means therefor, a supplemental framework may be provided as shown in the drawings. Such supplemental framework comprises, in the particular form here shown, two pairs, 19 and 20, of uprights mounted on the side-bars 12 of the main framework of the polisher to depend vertically therefrom, said uprights serving to carry a stationary rectangular supporting frame extending horizontally underneath the brush rolls and comprising a pair of side rails 22, and a pair of transverse cross rails 23.

In the illustrative embodiment of the novel apparatus here given, a shallow pan 24, preferably of metal or like rigid material, having an extended flat substantially rigid supporting wall or bottom, and low side walls, carries one or more blocks or slabs 25 of paraffin for presentation thereof in fractional engagement with the polisher brush-rolls. The body of paraffin may be centered between side blocks 26 of wood or the like with which the pan may be provided, the side blocks also functioning in this instance as reinforcing members along opposite sides of the pan. Said pan rests upon a rectangular base frame consisting of head and foot cross-pieces 27 and 28, respectively, and side pieces 29, which frame is bodily movable up and down, as will be further explained presently. In the present example, the frame is supported so that its under face is substantially horizontal; but the head cross-piece 27 is higher than the foot cross-piece 28, so that the pan 24 is inclined, its bottom being substantially parallel to the axes of the brush rolls above.

In the present illustrative embodiment of my novel apparatus, the improved adjusting means comprises an inclined plane or wedge arrangement and a single hand-operated screw mechanism cooperating therewith to effect vertical adjustment of the pan and its movable supporting base frame bodily toward and from the brush rolls in a manner to cause, upon the forward adjusting movement a presentation of the slab of wax in frictional engagement with the brush rolls, substantially uniform over all points of the surfaces engaged. The inclined plane or wedge arrangement, in the embodiment here shown, comprises blocks 30 secured to the under side of the vertically movable base frame of the pan, one block at each of the four corners of said frame, these blocks having inclined lower faces adapted to cooperate in sliding engagement with the complementary inclined faces of blocks 31 secured upon the upper side of a rectangular slide-frame 32, one block adjacent each corner of the frame. As shown in the drawings, the slide-frame 32 is supported for sliding movement transversely of the brush rolls upon the side and cross rails 22, 23 of the supplemental framework hereinbefore referred to. To aid in guiding the slide-frame 32 with the blocks 31 mounted thereon for rectilinear movement transversely of the apparatus, upright guide members 33 may be disposed on opposite transverse sides of the supplemental framework, secured at their lower ends to the horizontal cross rails 23 and at their upper ends to lateral guide rails 34, one of said guide rails connecting the vertical supporting members 19 and the other connecting the like members 20, all as indicated in the drawings.

The means for imparting movement to the slide-frame 32 may be of any appropriate character. The desirable practical form here shown comprises a screw 35 working in a threaded bushing 36 in an end member of the slide-frame 32, as shown in Fig. 1. As also there shown, the screw is rotatable in the outward end portion of a stationary yoke-like member 37, rigidly mounted upon and projecting on one side of the apparatus from the stationary supplemental frame-work referred to, the screw being held against longitudinal movement by collars 38. A crank 39 is provided for manual operation of the screw to move the frame 32 in either direction to raise or lower the base-frame 29 and the pan 24 carried thereby.

It is clear from the arrangement of parts as viewed in Fig. 1, that a movement of the frame 32 to the right moves the blocks 31 with respect to the blocks 30 and bodily lowers the holder structure and slab of wax, and that a movement of the frame 32 to the left bodily elevates the holder and slab. The slab is shown in full lines in Fig. 1 in elevated position in substantial frictional engagement with the brush rolls, the dotted line indicating a lowered position of the upper face of the slab out of contact with the rolls.

In using paraffin in substantially solid form, it is found that most effective results are obtained in the formation of a coating and polish when the slab of paraffin wax or the like is presented to the brush rolls over a substantial length of the rolls, preferably approximating three-fourths of their length. Hence, in the present illustrative example, the holder for the wax and the supplemental framework in which that holder is mounted for free vertical movements of adjustment are designed for such extensive presentation and a slab or slabs of the wax of the required dimensions is employed. These relative dimensions of the operating parts of the apparatus and of the slab of wax employed appear from the drawings.

As appears from the drawings, the pan 24, constituting the holder for the wax, is disposed with opposite side portions adjacent its ends in sliding contact with the stationary uprights 19 and 20, this arrangement guiding the pan and preventing lateral shifting movement of the slab of wax under the frictional engagement therewith of the rotating brush rolls.

As hereinbefore stated, it is desirable to use paraffin wax of low melting point in order to facilitate proper spreading of the protective material on the fruit. In case it becomes necessary or desirable to employ heat, the apparatus may be provided, for example, with a special housing, (not shown) having heating means installed therein to warm the pan and rolls; or electric heating coils or the like may be nested in the bottom framework of the pan.

In using the apparatus for treating fruit with a coating and polishing material such as paraffin wax or the like, the slab of wax is bodily adjusted in the manner hereinbefore described to provide that frictional engagement of the brush rolls therewith which will cause the brush rolls in their rotation to take up the required supply of the material over the extended portions of the rolls referred to. The fruit is fed to the upper or receiving end of the apparatus over the chute board 17 and passes down the sloping runways formed by the cooperating pairs of inclined parallel polisher rolls, the rate at which the fruit travels down the runways being dependent among other things upon the rate at which the rolls are rotated. During its progress along that portion of the brush surfaces supplied with the wax, the fruit takes up the material more or less over its entire surface, the final distribution of the material as a coating over the entire surface of the fruit and the completion of the polish resulting from the continued movements of the fruit through the runways beyond the portions supplied with the wax to the discharge end of the apparatus. In the continued operation of the apparatus all the required adjustments of the body of wax with respect to the brush rolls may be made in the manner hereinbefore stated, by simply turning the crank 39 in clockwise or counterclockwise direction.

While paraffin wax is referred to in the foregoing specification and also in the accompanying claims as the material employed, and in the form of a slab, it is to be understood that this wax is thus referred to merely as an example of the type of substantially solid coating and polishing material adapted for the particular fruit treatment here referred to, and the slab as a body form of the material convenient in use.

What is claimed is:

1. Apparatus for treating fruit comprising the combination, with fruit brushing means having a plurality of brush-rolls, of a holder for a body of substantially solid coating material, such as a slab of paraffin wax, freely mounted for movements of adjustment toward and away from said brush rolls and adapted to present a face of said slab in adjustable frictional engagement with said brush rolls, and adjusting means having a single hand-operated part operable to bodily advance and withdraw said holder with respect to said brush rolls.

2. Apparatus for treating fruit comprising the combination, with brush-rolls cooperating to provide a runway for fruit, of a holder for a cake or slab of paraffin wax freely mounted for movements of adjustment toward and away from said brush rolls and adapted to present a face of said slab in adjustable frictional engagement with said brush rolls, and a unitary adjusting means operable to withdraw or advance said holder bodily with respect to said brush rolls.

3. Apparatus for treating fruit comprising the combination, with parallel polisher brush rolls cooperating to provide a polisher runway extending longitudinally thereof, of a holder for a cake or slab of paraffin wax disposed below said brush rolls for upward and downward movements of adjustment to enable the presentation of said slab in adjustable frictional engagement with said brush rolls, and adjusting means operable to raise and lower said holder comprising a plurality of adjustable supporting devices for said holder and means for actuating said devices simultaneously to raise or lower said container.

4. Apparatus for treating fruit comprising the combination, with inclined parallel polisher brush rolls cooperating in pairs to provide inclined polisher runway means extending longitudinally thereof, of means disposed below said brush rolls for supporting a slab of paraffin wax, said supporting means extending from near the upper ends of said rolls less than the entire distance to their lower ends and mounted for upward and downward movements of adjustment to present said slab into and out of adjustable frictional engagement with said brush rolls, and adjusting means having a single hand-operated part effecting its operation to bodily raise and lower said supporting means.

5. Apparatus for treating fruit comprising the combination, with parallel brush rolls cooperating to provide a runway for fruit extending longitudinally thereof, of a shallow pan mounted below said brush rolls for upward and downward movements of adjustment and arranged to present a face of said slab in adjustable frictional engagement with a plurality of brush rolls, and means for imparting movements of adjustment to said holder comprising a plurality of lifting and lowering means operating upon said pan at spaced points and unitary hand-operated adjusting means arranged and adapted to operate all said lifting and lowering means simultaneously.

6. Apparatus for treating fruit comprising the combination, with parallel brush rolls cooperating to provide a runway for fruit extending longitudinally thereof, of a shallow pan mounted below said brush rolls for upward and downward movements of adjustment and adapted to present a face of a contained slab of paraffin or the like in adjustable frictional engagement with a brush-roll over a portion of said roll extending longitudinally thereof, and means for imparting movements of adjustment to said pan comprising a plurality of movable lifting and lowering elements operating upon said holder at points spaced longitudinally of said brush rolls and a unitary hand-operated adjusting means arranged and adapted to impart simultaneous operating movement to said lifting and lowering elements.

7. Apparatus for treating fruit comprising the combination, with parallel brush rolls cooperating in pairs to provide runways for fruit extending longitudinally thereof, of a holder for a body of paraffin wax in cake or slab form mounted below said brush-rolls for upward and downward movements of adjustment and arranged to present a face of said body in adjustable frictional engagement with a major portion of the under sides of said brush-rolls, and means for imparting movements of adjustment to said holder comprising a plurality of movable lifting and lowering elements operating upon said holder at points spaced transversely of said brush rolls and a unitary hand operated adjusting means arranged and adapted to impart operating movement to said lifting and lowering elements.

8. Apparatus for treating fruit comprising the combination, with parallel polisher brush-rolls cooperating to provide polisher runways extending longitudinally thereof, of a framework disposed therebelow, a holder for a slab of paraffin wax or like non-fluent coating and polishing material mounted in said framework for upward and downward movements of adjustment, said holder having slab-supporting means of an extent and arrangement to present, upon upward adjustments of said holder, a slab in adjustable frictional engagement with said brush rolls over a major portion of their under surfaces, and means for imparting said movements of adjustment to said holder comprising a plurality of movable lifting and lowering elements operating on said holder at points spaced apart transversely and longitudinally of said brush rolls and unitary hand-operated means arranged and adapted to impart simultaneous operating movements to said lifting and lowering elements.

9. Apparatus for treating fruit comprising the combination, with fruit brushing means, of means for holding a body of substantially solid coating material in contact with said brushing means, and unitary adjusting means operable to move such holding means toward or away from said brushing means.

10. Apparatus for treating fruit comprising the combination, with a rotary brush, of a holder for a slab of paraffin wax, adapted to present a face of such slab in adjustable frictional engagement with said brush, and unitary hand-operated means operable to withdraw or advance said holder bodily with respect to said brush.

In testimony whereof I hereunto affix my signature.

ALBERT HAWORTH.